(12) United States Patent
Pfister

(10) Patent No.: US 8,042,416 B2
(45) Date of Patent: Oct. 25, 2011

(54) LINEAR MODULE

(75) Inventor: Steffen Pfister, Niederwerrn (DE)

(73) Assignee: Robert Bosch GmbH, Stuttgart (DE)

( * ) Notice: Subject to any disclaimer, the term of this patent is extended or adjusted under 35 U.S.C. 154(b) by 976 days.

(21) Appl. No.: 11/962,706

(22) Filed: Dec. 21, 2007

(65) Prior Publication Data

US 2008/0190225 A1    Aug. 14, 2008

(30) Foreign Application Priority Data

Feb. 8, 2007    (DE) .......................... 10 2007 006 249

(51) Int. Cl.
*F16H 3/06* (2006.01)
*F16H 27/02* (2006.01)
*F16H 29/02* (2006.01)
*F16H 29/20* (2006.01)

(52) U.S. Cl. ..................................... 74/89.33; 74/89.35

(58) Field of Classification Search ................ 74/89.23, 74/89.32, 89.33, 89.34, 89.35; 384/7, 43
See application file for complete search history.

(56) References Cited

U.S. PATENT DOCUMENTS

| | | | | |
|---|---|---|---|---|
| 2,227,404 A * | 12/1940 | Zimmermann | ................. | 74/609 |
| 5,097,716 A * | 3/1992 | Barbat et al. | ................. | 74/89.32 |
| 5,195,391 A * | 3/1993 | Barbat et al. | ................. | 74/89.22 |
| 5,676,016 A | 10/1997 | Nagai et al. | | |
| 5,913,941 A * | 6/1999 | Erikson et al. | ............ | 74/424.95 |
| 6,148,714 A | 11/2000 | Abe et al. | | |
| 6,588,289 B2 * | 7/2003 | Ung et al. | ...................... | 74/89.4 |
| 7,481,126 B2 * | 1/2009 | Las Navas Garcia | ........ | 74/89.23 |
| 7,794,150 B2 * | 9/2010 | Keller et al. | ................... | 384/45 |

FOREIGN PATENT DOCUMENTS

| | | |
|---|---|---|
| DE | 39 09 513 | 9/1990 |
| DE | 199 01 109 | 7/1999 |
| GB | 2 358 056 | 7/2001 |
| WO | 02/16641 | 2/2002 |

* cited by examiner

*Primary Examiner* — Justin Krause
(74) *Attorney, Agent, or Firm* — Michael J. Striker

(57) ABSTRACT

A linear module includes a baseplate unit, a table part, a spindle drive device, and a telescoping tube arrangement that encompasses the spindle and that has two tube elements that engage with each other in telescoping fashion in a movement direction, namely a tube element connected to the baseplate unit and a tube element connected to the table part. The tube element connected to the table part is connected to the table part over a portion of its length by at least one bridge piece and the tube element connected to the baseplate unit has at least one slot embodied to accommodate the at least one bridge piece.

9 Claims, 5 Drawing Sheets

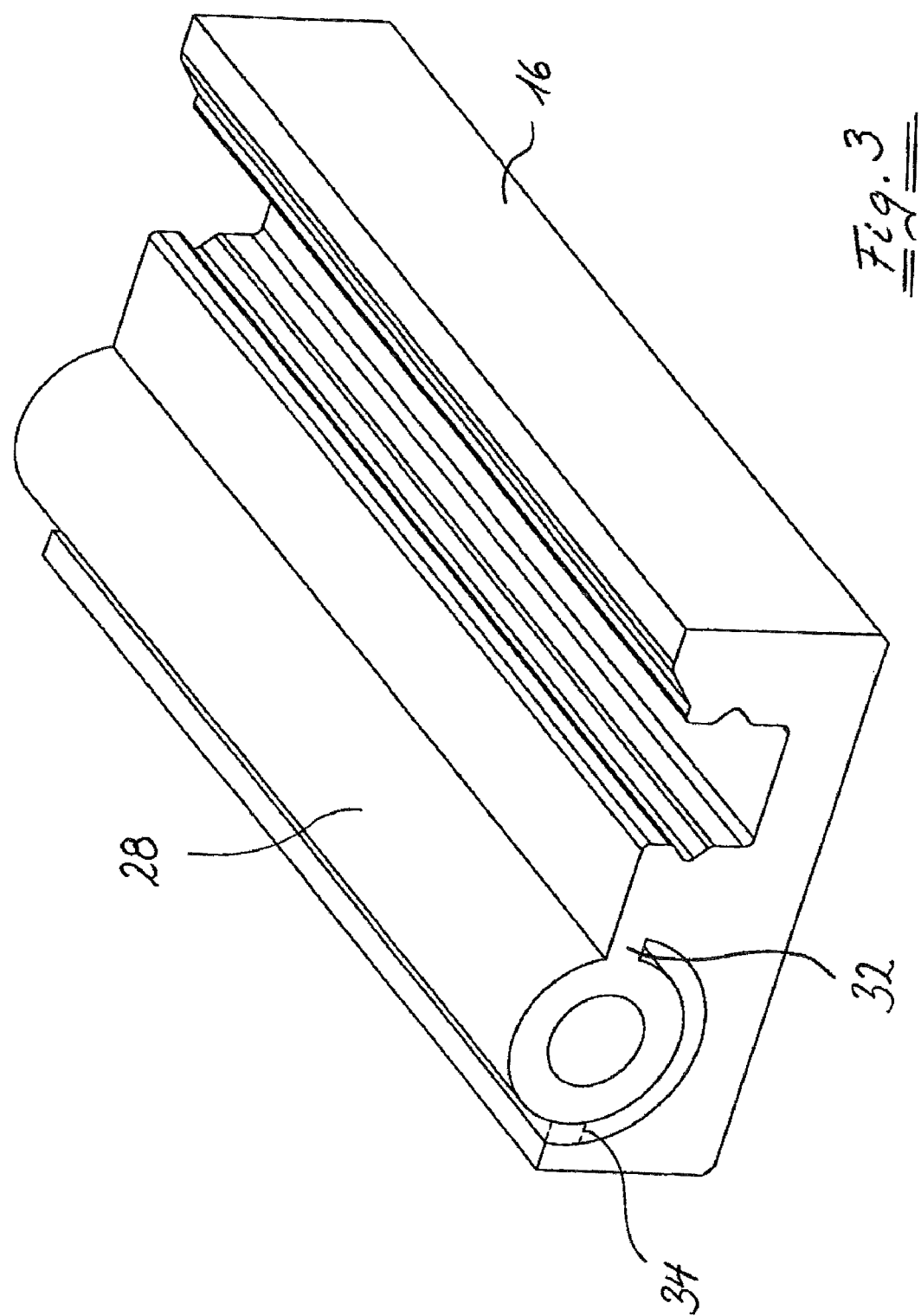

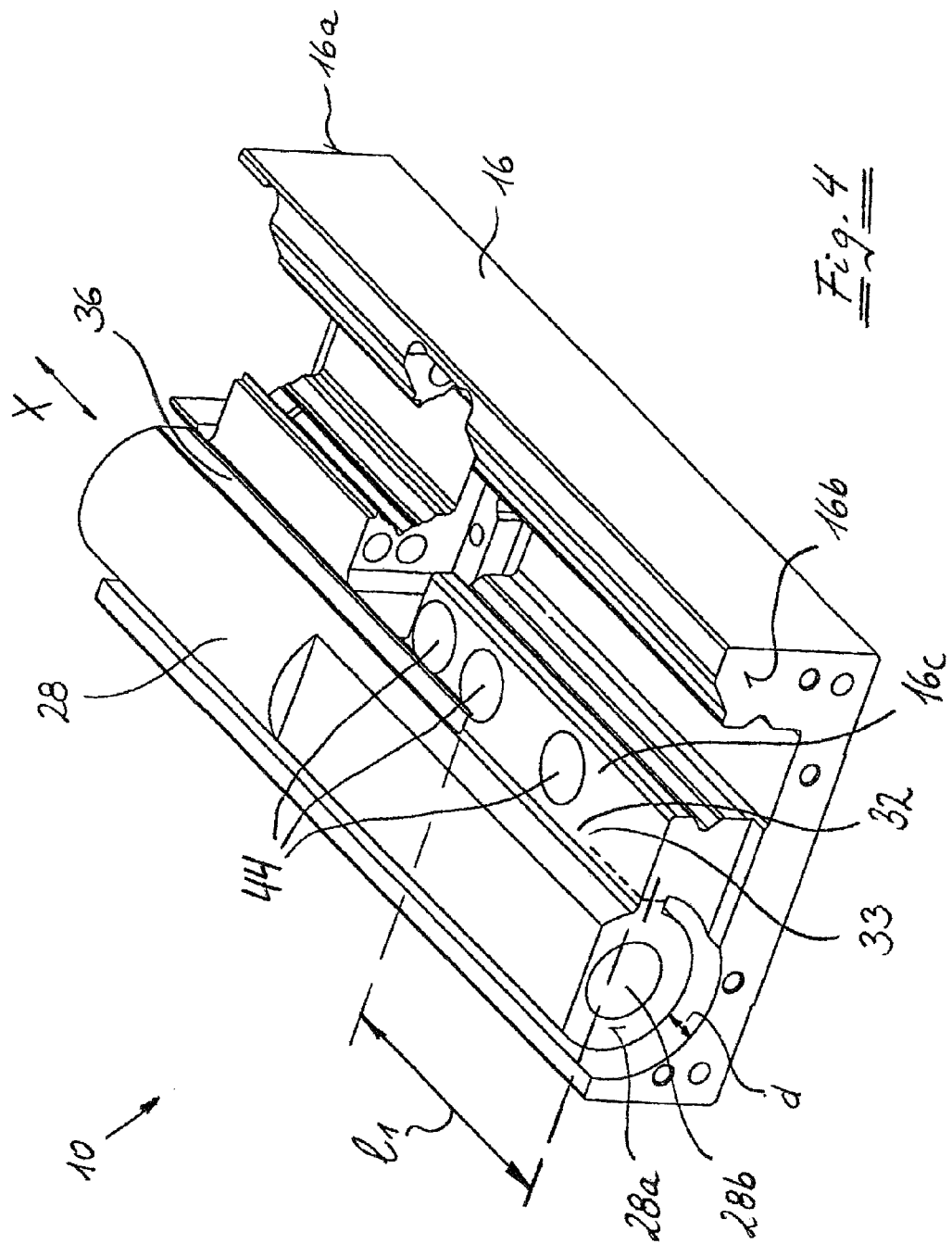

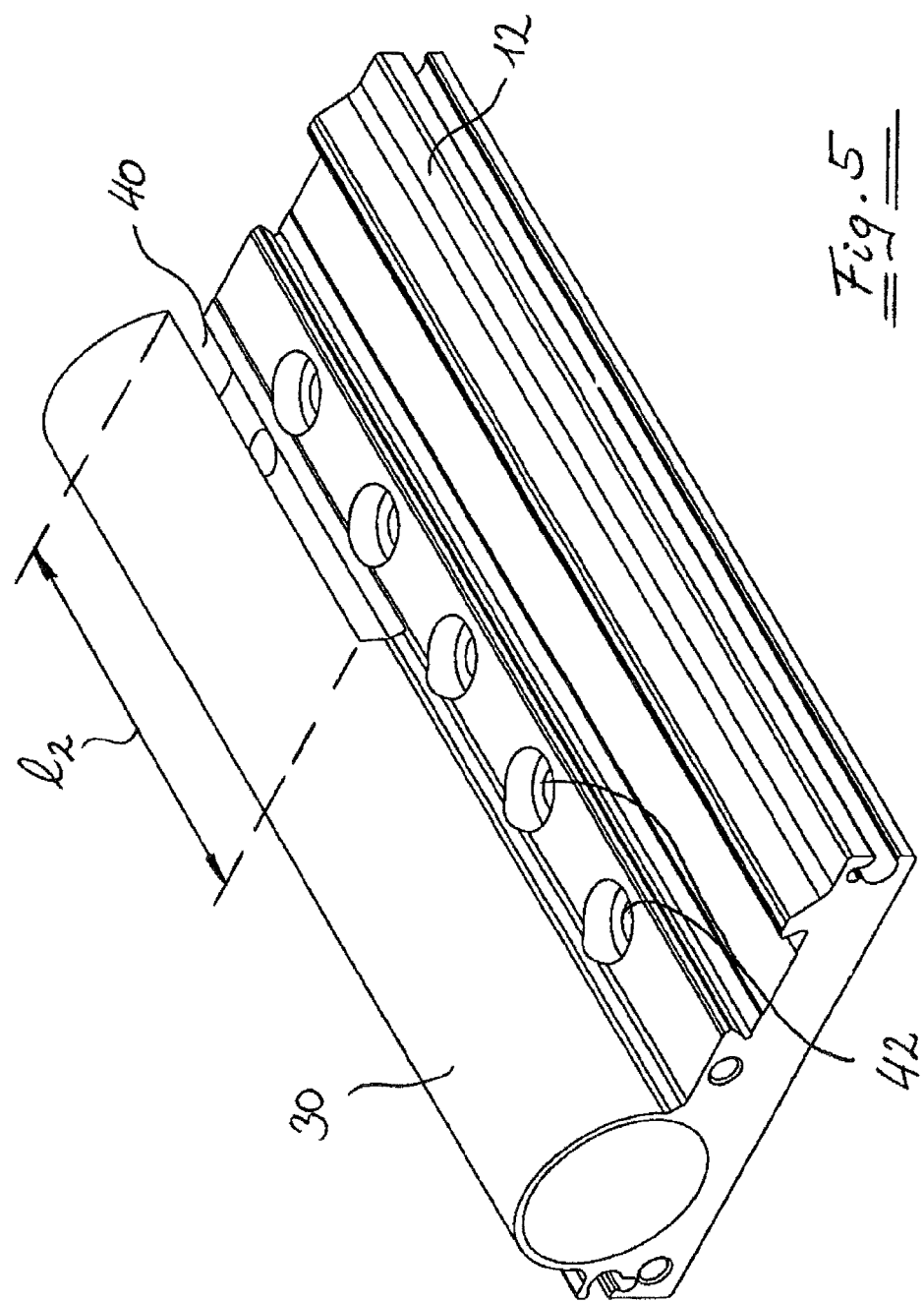

LINEAR MODULE

CROSS-REFERENCE TO A RELATED APPLICATION

The invention described and claimed hereinbelow is also described in German Patent Application DE 10 2007 006 249.6 filed on Feb. 8, 2007. This German Patent Application, whose subject matter is incorporated here by reference, provides the basis for a claim of priority of invention under 35 U.S.C. 119(a)-(d).

BACKGROUND OF THE INVENTION

The invention relates to a linear module having a baseplate unit, a table part, a spindle drive device equipped with a spindle that is connected in a force-transmitting fashion to a drive unit mounted on the baseplate unit and with a nut that is connected to the table part and engages with the threads of the spindle, and a telescoping tube arrangement that encompasses the spindle and has two tube elements that engage with each other in telescoping fashion in a movement direction, namely a tube element connected to the baseplate unit and a tube element connected to the table part.

A linear module of this kind is known from U.S. Pat. No. 5,676,016. In this linear module, the tube element connected to the table part is fastened to an end plate that is in turn connected to the table part. This has the disadvantage that the tube element connected to the table part, at least in the telescopically extended state, must support its own weight over a relatively long length before it telescopically engages with the tube element connected to the baseplate unit. A more serious disadvantage, however, is that any external force to which the end plate is subjected during operation of the linear module inevitably generates bending moments on the tube element connected to the table part. But the resulting deformations increase the friction, thus hindering the telescoping engagement of the two tube elements, when not causing a tilting of the two tubes.

SUMMARY OF THE INVENTION

The object of the present invention, by contrast, is to produce a linear module in a way that reduces the bending moments acting on the tube element connected to the table part.

This object is attained according to the invention by a linear module of the type mentioned at the beginning in which the tube element connected to the table part is connected to the table part by means of a bridge piece over at least a portion of its length while the tube element connected to the baseplate unit has at least one slot for accommodating the at least one bridge piece. By virtue of the bridge piece provided according to the present invention, the tube element is not attached just at its one end, as is the case in the prior art, but instead has a stable connection to the table part over a portion of its length. The bridge piece can therefore very effectively isolate the tube element from bending moments.

Also as a result of this increased stability in relation to bending moments, the two tube elements can even be guided on each other since bending moments exerted on the tube element connected to the table part cannot, as in the prior art, lead to an increase in friction and therefore a blocking of the telescoping movement. This close guidance on each other is better able to protect the interior of the telescoping tube arrangement from the penetration of dirt without the provision of additional sealing measures. In this embodiment, it can be useful to provide a slide bushing made of plastic between the metal tubes so as to avoid unnecessary wear due to the unfavorable sliding pair of aluminum on aluminum.

In order to assure that the bridge piece can be completely accommodated in the slot in the telescopically retracted state, it is possible for the length of the at least one bridge piece to advantageously be at most the same size as the slot associated with this bridge piece.

According to a modification of the invention, the length of the at least one slot is dimensioned so that it is still covered by the table part even in the telescopically extended state. This, too, has advantages with regard to the penetration of dirt, but also has advantages with regard to the visual appearance of the overall apparatus.

In order to be able to provide the largest possible telescoping distance, it is also possible for the at least one bridge piece to adjoin the tube element connected to the table part, at its end oriented away from the drive unit.

In order to be able, even with the exertion of external forces on the table part, particularly on an end plate attached to its end surface, to reliably prevent all but a small amount of their transmission to the tube element connected to the table, according to a modification of the invention, the tube element connected to the table part, at its end oriented away from the drive unit, is recessed by a predetermined amount in relation to an adjacent end surface of the table part in the telescoping direction.

In this case, or even if no end plate is provided on the end surface of the table part oriented away from the drive unit, in order to be able to prevent the penetration of dirt into the interior of the telescoping tube arrangement in an easy-to-manufacture way, according to another embodiment, the tube element connected to the table part, at its end oriented away from the drive unit, is closed by means of a closing element, for example a stopper preferably made of plastic. In this way, the telescoping arrangement can also be filled with lubricant, for example grease, so that it is possible to assure a durable, maintenance-free lubrication of the spindle.

In order to be able to produce the entire linear module in a preassembled fashion, according to another embodiment, the table part has at least one through opening, which, when the table part is mounted on the baseplate unit, permits access to the attachment points of the baseplate unit. This permits access to the attachment points at which the baseplate unit can be mounted to a larger structural unit of a production line or the like.

If the tube element connected to the table part is embodied as separate from it and is screw-connected to it, then this permits a particularly easy manufacture of the linear module. Basically, however, it is also conceivable for the tube element connected to the table part to be of one piece with the table part, which offers particular advantages with regard to stability and is therefore accompanied by a reduction of the transmission of bending moments to the tube element. Since this feature taken by itself is also not known from the prior art, separate protection is sought for it.

In any case, however, it is preferable for the table part to be manufactured out of an extrusion-molded profile element that is preferably made of a light metal or a light metal alloy, for example aluminum. With a one-piece embodiment of the bridge piece and table part, the bridge piece can in this case be obtained, for example, by milling away a part of the at least one connecting bridge of the tube element to the table part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3 and 4 are perspective views of the underside of the table part of the linear module according to the invention, with FIG. 3 showing the unfinished extrusion-molded blank for the table part and FIG. 4 showing the finished extrusion-molded blank; and FIG. 5 is a perspective top view of the baseplate unit of the linear module according to the invention.

DESCRIPTION OF THE PREFERRED EMBODIMENTS

Figure 1:
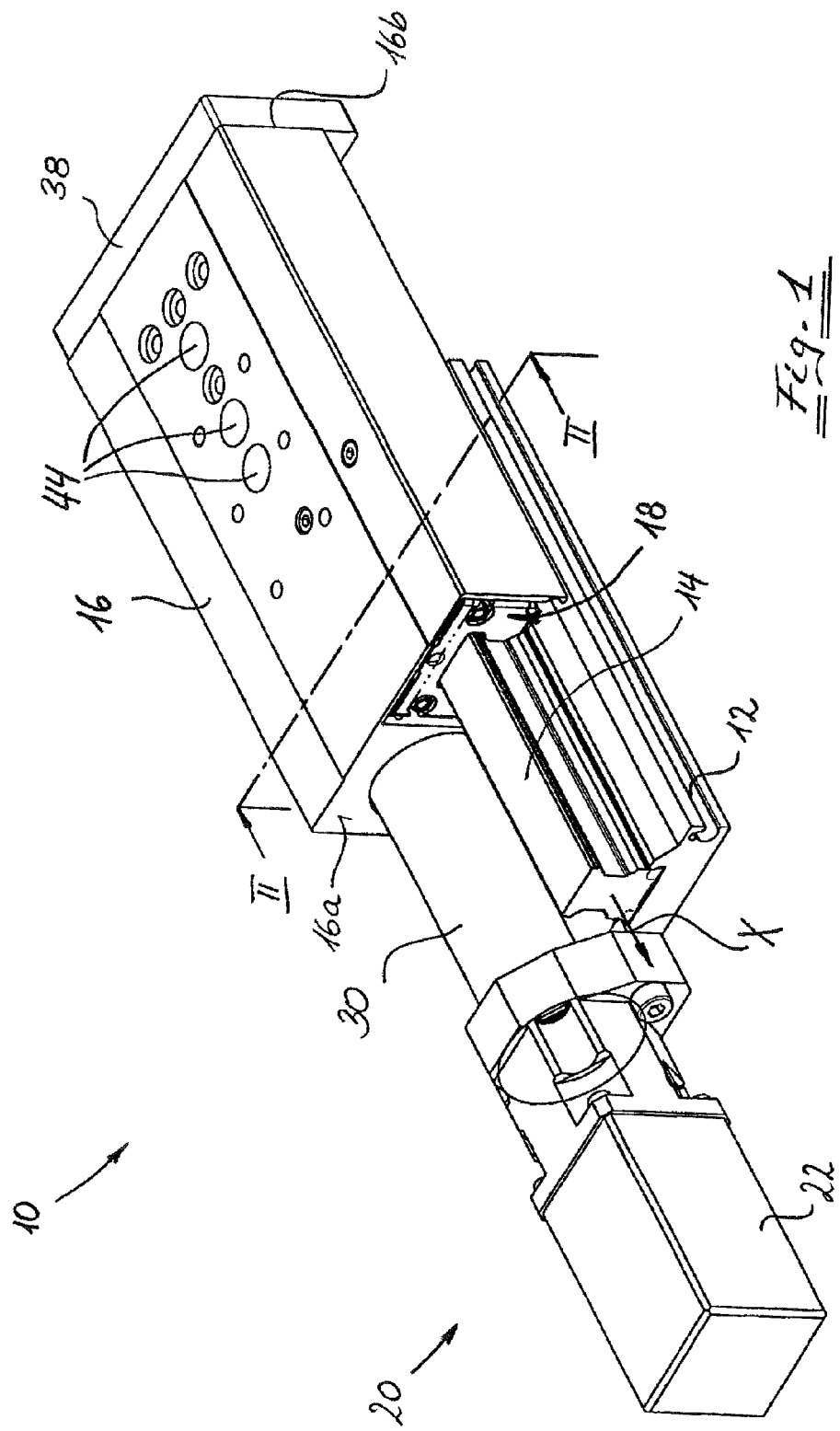
FIG. 1 is a perspective overall view of a linear module according to the invention.
Figure 2:
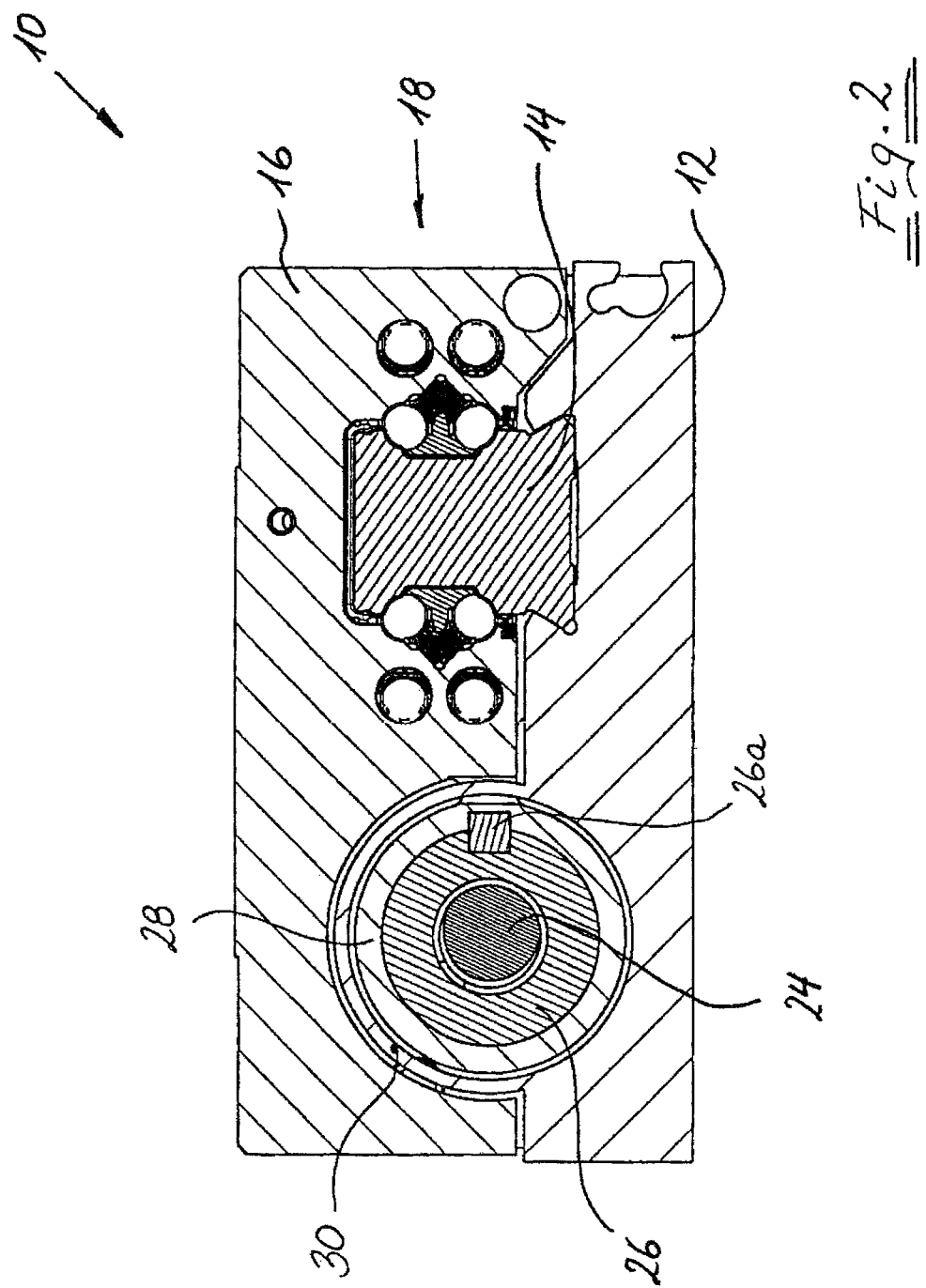
FIG. 2 is a cross section through the linear module from FIG. 1, viewed in the plane that is labeled II-II in FIG. 1.

In FIGS. 1 and 2, a linear module according to the invention is labeled as a whole with the reference numeral 10. It includes a rail 14 that is mounted on a baseplate 12 and extends in a longitudinal direction X. It also includes a table part 16, which a linear guide device 18 guides so that it is able to slide on the rail 14 in its longitudinal direction X. In order to drive the table part 16 in relation to the rail 14, a spindle drive 20 is provided, with a spindle 24 that is driven by a motor 22 and engages with the threads of a nut 26.

As particularly shown in FIG. 2, the spindle 24 and nut 26 of the spindle drive 20 are encompassed by an inner tube element 28 and an outer tube element 30, which engage each other in telescoping fashion. An element 26a fastens the nut 26 in both rotatory and translatory fashion inside the inner tube element 28. FIG. 2 also shows that the outer tube element 30 is of one piece with the baseplate unit 12, while the inner tube element 28 is associated with the table part 16.

The structure and manufacture of the table part 16 with the inner tube element 28 and the baseplate unit 12 with the outer tube element 30 will be explained in detail below in conjunction with FIGS. 3 through 5:

As shown in FIG. 3, the table part is manufactured starting from a segment of an extrusion-molded profile. In the exemplary embodiment shown, this extrusion-molded profile already has the tube element 28 integrally formed into it. It is, however, also essentially conceivable for the tube element 28 to be produced separately from the table part 16 and to be attached to it, for example, by means of screws, as depicted with dashed lines in FIG. 4. In addition, in the exemplary embodiment shown in FIG. 3, the tube element 28 is connected to the table part 16 only by means of a single connecting bridge 32. Basically, however, it is also possible for a plurality of such connecting bridges to be provided, as depicted with dashed lines in FIG. 3 at 34.

In a first processing step, as shown in FIG. 4, the connecting bridge 32 is milled away at the end surface 16a of the table part 16 oriented toward the rear in FIG. 4 and toward the front in FIG. 1. This milled region is labeled with the reference numeral 36 in FIG. 4.

In a second processing step, at the end 16b of the table part oriented toward the front in FIG. 4 and toward the rear in FIG. 1, a part of the tube element 28, the connecting bridge 32, and the section 16c of the table part 16 supporting it are milled away so that the end surface 28a of the tube element 28 is slightly recessed by a certain distance d from the surface 16b of the table part 16. This makes it possible to prevent external forces that are exerted on an end plate 38 of the table part (see FIG. 1) from being transmitted to the tube element 28.

After these two processing steps, of the original connecting bridge 32, only a bridge piece 33 with the length $l_1$ remains. This length $l_1$, however, is dimensioned so that bending moments due to external forces are unable to influence the tube element 28 or are only able to do so to a slight degree.

As shown in FIG. 5, the baseplate unit 12 can also be produced starting from an extrusion-molded profile that has the tube element 30 integrally formed into it. In order to be able to provide a receiving space for the bridge piece 33 in the telescopically retracted state of the linear module 10, the tube element 30 has been provided with a lateral slot 40 whose length $l_2$ is at least equal to the length $l_1$ of the bridge piece 33. Preferably, however, the length $l_2$ is greater than the length $l_1$ of the bridge piece 33 by at least the distance d of the recess-milling of the tube element 28 (see FIG. 4).

FIG. 5 also shows accommodating recesses 42 that serve to accommodate the heads of studs by means of which the baseplate unit 12 can be fastened to a larger structural unit. In order to be able to deliver the linear module 10 in the preassembled state shown in FIG. 1 and to nevertheless be able to permit the linear module 10 to be mounted to the larger structural unit, through openings 44 are provided in the table part 16 (also see FIG. 4), which permit a fastening tool, for example a screwdriver, an Allen wrench, or the like, to access the attachment points 42.

It should also be noted that the lumen 28b of the tube element 28 can be closed in the region of its end surface 28a by means of a stopper that is not shown in the drawings.

It will be understood that each of the elements described above, or two or more together, may also find a useful application in other types of constructions differing from the type described above.

While the invention has been illustrated and described as embodied in a linear module, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A linear module, comprising:
a baseplate unit; a table part;
a drive unit mounted on said baseplate unit; a nut connected to said table part;
a spindle drive device having a spindle that is connected in a force-transmitting fashion to said drive unit mounted on said baseplate unit and with said nut that is connected to said table part and engages with thread of said spindle; and
a telescopic tube arrangement that encompasses said spindle and has two tube elements that engage with each other in a telescoping fashion in a movement direction and include a first tube element connected to said baseplate unit and a second tube element connected to said table part, whereby said second tube element is able to slide out from the first tube element in order to lengthen the linear module, said second tube element connected to said table part being connected to said table part over a portion of its length by at least one bridge piece, and said first tube element connected to said baseplate unit having at least one slot configured to accommodate said at least one bridge piece.

2. A linear module as defined in claim 1, wherein said at least one bridge piece has a length which is at most the same as a length of said slot associated with said bridge piece.

3. A linear module as defined in claim 1, wherein said at least one slot has a length which is dimensioned so that said at least one slot is always completely covered by said table part even in a telescopically extended state.

4. A linear module as defined in claim 1, wherein said at least one bridge piece adjoins said second tube element which is connected to said table part, at an end of said table part oriented away from said drive unit.

5. A linear module as defined in claim 1, wherein said second tube element connected to said table part, at an end of said table part oriented away from said drive unit, is recessed in relation to an adjacent end surface of said table part in a telescoping direction.

6. A linear module as defined in claim 1, wherein said table part has at least one through opening which, when said table part is mounted on said baseplate unit, permits access to attachment points of said baseplate unit.

7. A linear module as defined in claim 1, wherein said second tube element connected to said table part is configured of one piece with said table part.

8. A linear module as defined in claim 1, wherein said table part is a part manufactured out of an extrusion-molded profile element.

9. A linear module as defined in claim 1, wherein said table part is a part manufactured out of an extrusion-molded profile element composed of aluminum.

\* \* \* \* \*